United States Patent [19]
Mickael

[11] Patent Number: 5,528,030
[45] Date of Patent: Jun. 18, 1996

[54] SYSTEM FOR DETERMINING GAS SATURATION OF A FORMATION AND A WELLBORE THROUGH CASING

[75] Inventor: Medhat W. Mickael, Sugar Land, Tex.

[73] Assignee: Western Atlas International, Inc., Houston, Tex.

[21] Appl. No.: 406,385

[22] Filed: Mar. 17, 1995

[51] Int. Cl.$^6$ ............................................. G01V 3/10
[52] U.S. Cl. .................. 250/269.4; 250/256; 250/264; 250/265; 250/266; 250/269.1; 250/269.5
[58] Field of Search ................... 250/269.4, 256, 250/265, 266, 264, 269.1, 269.5

[56] References Cited

U.S. PATENT DOCUMENTS

| | | | |
|---|---|---|---|
| 4,092,536 | 5/1978 | Smith | 250/266 |
| 5,051,581 | 9/1991 | Hertzog | 250/269.4 |

*Primary Examiner*—Constantine Hannaher
*Assistant Examiner*—Virgil Orlando Tyler
*Attorney, Agent, or Firm*—Richard A. Fagin

[57] ABSTRACT

A system for determining formation gas saturation in a cased wellbore which includes a neutron logging tool having a source, a first neutron detector offset towards the wellbore primarily sensitive to the wellbore and a second detector spaced further from the source and offset towards the formation, so that the second detector is sensitive primarily to liquid-filled porosity in the formation. The detectors are encased in a neutron moderator. The system includes a method of determining gas saturation in the formation by measuring count rates at the detectors, generating a wellbore gas saturation from the first detector counting rate, generating a ratio of counting rates of the second and first detectors to generate a value of liquid-filled porosity in the formation, and calculating a gas saturation in the formation by combining the liquid-filled porosity with a measurement of total porosity. The total porosity measurement can be obtained from core samples or other well logs run before the casing in set in the wellbore.

13 Claims, 9 Drawing Sheets

SYSTEM FOR DETERMINING GAS SATURATION OF A FORMATION AND A WELLBORE THROUGH CASING

BACKGROUND OF THE INVENTION

1. Field of the Invention

The present invention is related to the field of oil and gas wellbore logging. More specifically, the present invention is related to a system for determining the fractional gas saturation of an earth formation from within a cased wellbore which may be at least partially filled with gas.

2. Discussion of the Related Art

Oil and gas wellbores are typically surveyed, or logged, while they are still uncased, or directly exposed to the earth formations through which they are drilled. Logging is performed in order to determine certain properties of the earth formations. An instrument known in the art which is used to survey open wellbores is called a neutron logging tool. The neutron logging tool typically includes a source of high energy, or fast, neutrons, and at least one detector which is sensitive to lower energy neutrons. Neutron logging tools known in the art are primarily responsive to the concentration of hydrogen nuclei in the earth formation. Hydrogen nuclei are typically present in high concentrations in fluids which can fill void spaces, or porosity, which can exist in some earth formations. Oil and gas, if present in a particular earth formation, are generally present in the porosity. Neutron tools provide measurements which can be used in determining the fractional volume of the earth formation which is occupied by the porosity, and therefore provide an indication of the volume of oil and gas which may be present in the formation.

Measurements made by neutron logging tools known in the art are highly sensitive to the presence of gas. Even though gas consists essentially of hydrogen and carbon, it has a much lower density than water or oil. Therefore gas typically provides lower overall hydrogen nucleus concentration in a particular earth formation than does water or oil. Consequently, neutron tools are useful for determining the depth in the wellbore at which, for example, gas is in contact with oil or water within the porosity of a particular formation. Neutron logs are also useful for determining changes in the depth of the gas/oil or gas/water contact in the formation which can occur over a period of time as fluids are extracted from the formation.

A drawback to using the neutron tool known in the art for determining gas contacts and gas saturation is that wellbores typically are "completed" in order to extract fluids from the formation, and gas can be present within the completed wellbore during extraction of fluids from the formation, as will be further explained.

Completing a wellbore typically includes the step of cementing a steel pipe, or casing, to a depth within the wellbore which at least includes the formation from which fluids are to be extracted. The cement filling the annular volume external to the casing and internal to the wellbore typically has a high hydrogen content, which can affect the measurements of the neutron tool known in the art.

During the production of fluids from the formation, gas may enter the wellbore from the formation either as gas exsolved from oil in the formation, or as gas produced directly from the formation. The neutron tools known in the art are typically calibrated to measure water-filled porosity of the formation from within a wellbore which is liquid-filled. Gas in the wellbore can affect the measurements of the neutron tool known in the art. Since the fractional volume of the wellbore which may be filled with gas is difficult to determine, it is impractical to adjust the measurements of the neutron tool known in the art for the amount of gas in the wellbore.

It is an object of the present invention to provide a neutron tool which can measure gas saturation in the formation in a wellbore having a cemented casing.

It is a further object of the present invention to provide a neutron tool which can measure gas saturation in the formation from within a wellbore which is at least partially filled with gas.

SUMMARY OF THE INVENTION

The present invention is a system for determining formation gas saturation in a wellbore having a casing. The system includes a neutron logging tool having a source of fast, or high energy neutrons, a first neutron detector which is offset towards the wellbore and is axially spaced from the source to be primarily sensitive to the wellbore, and a second detector axially spaced even further from the source and offset towards the formation, so that the second detector is sensitive primarily to liquid-filled porosity in the formation. The detectors are encased in a neutron moderator. In a particular embodiment of the invention, the moderator is composed of polypropylene.

The system also includes a method of determining gas saturation in the formation by measuring count rates at the detectors, generating a measurement of wellbore gas saturation from the first detector counting rate, generating a ratio of counting rates of the second and first detectors to generate a value of liquid-filled porosity in the formation, and calculating a gas saturation in the formation by combining the liquid-filled porosity with a measurement of total porosity.

The total porosity measurement can be obtained from core samples or other well logs run before the casing is set in the wellbore.

DESCRIPTION OF THE PREFERRED EMBODIMENT

The description of the preferred embodiment of the invention is divided into two parts. The first part describes the design of a neutron logging tool according to the present invention. The second part describes the theory of operation of the tool and discloses results of numerical simulation of the response of a tool designed according to the present invention.

1. Design of the Neutron Tool According to the Present Invention

Figure 1:
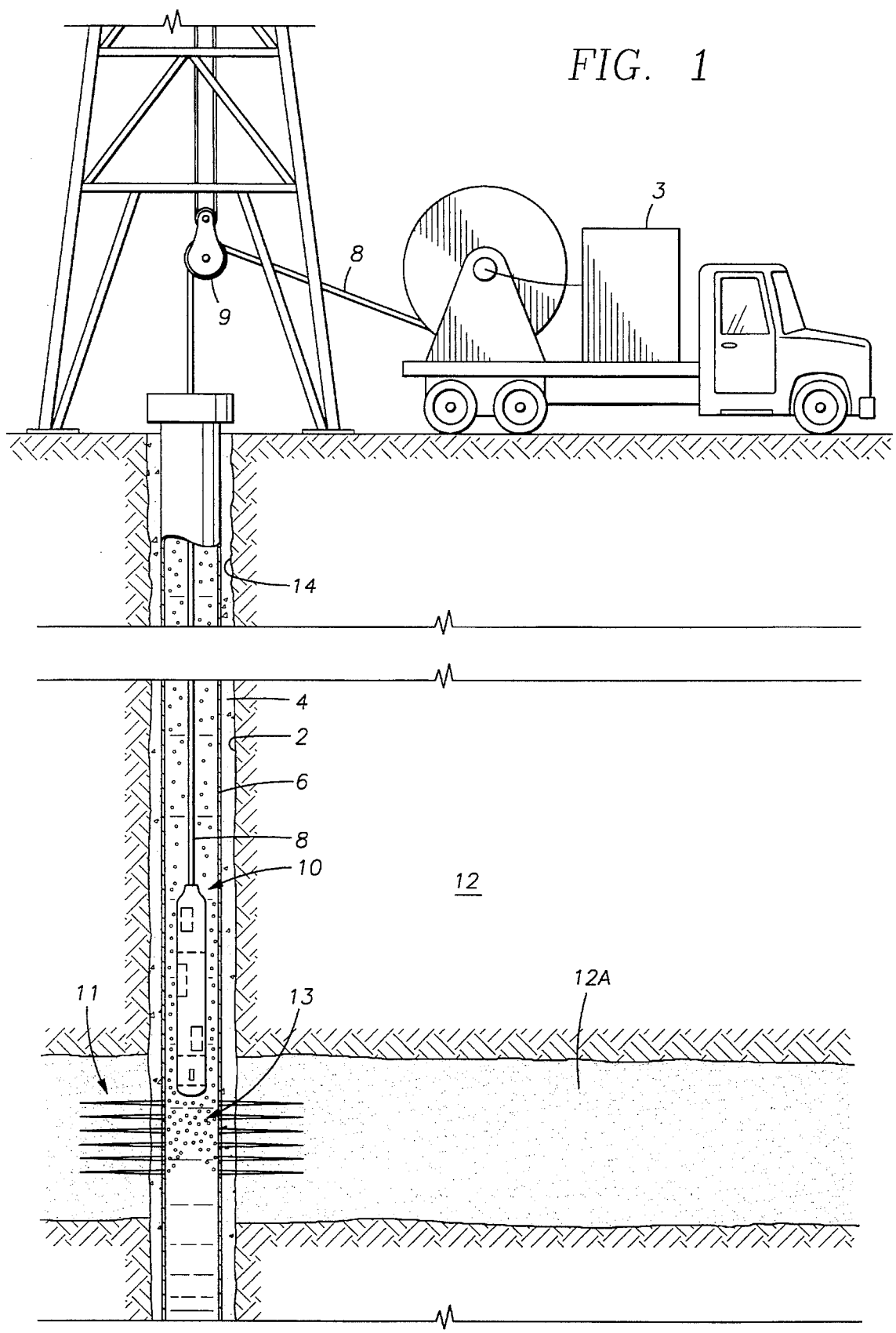
FIG. 1 shows a neutron tool according to the present invention being lowered into a wellbore.

FIG. 1 shows the apparatus of the present invention as it is typically used in a wellbore 2 penetrating a zone 12A in an earth formation 12. The wellbore 2 is completed with a steel casing 6 which is hydraulically sealed with cement 4 filling the annular volume between the casing 6 and the wellbore 2. Fluids 13 are produced into the wellbore 2 from the zone 12A through perforations 11 which penetrate the casing 6 and the cement 4. The fluids 13 can include gas. If gas is present in the fluids 13, then the gas can at least partially fill the wellbore 2 above the perforations 11.

A neutron logging tool 10 including the apparatus of the present invention is typically lowered into the wellbore 2 by means of an armored electrical cable 8. The cable 8 is electrically connected to surface electronics 3 which include equipment (not shown separately) to supply electrical power to the logging tool 10 and other equipment (not shown separately) to receive and interpret signals sent up the cable 8 by the tool 10. The cable 8 is typically extended into the wellbore 2 by means of a winch 9 or similar equipment located at the earth's surface.

Figure 1A:
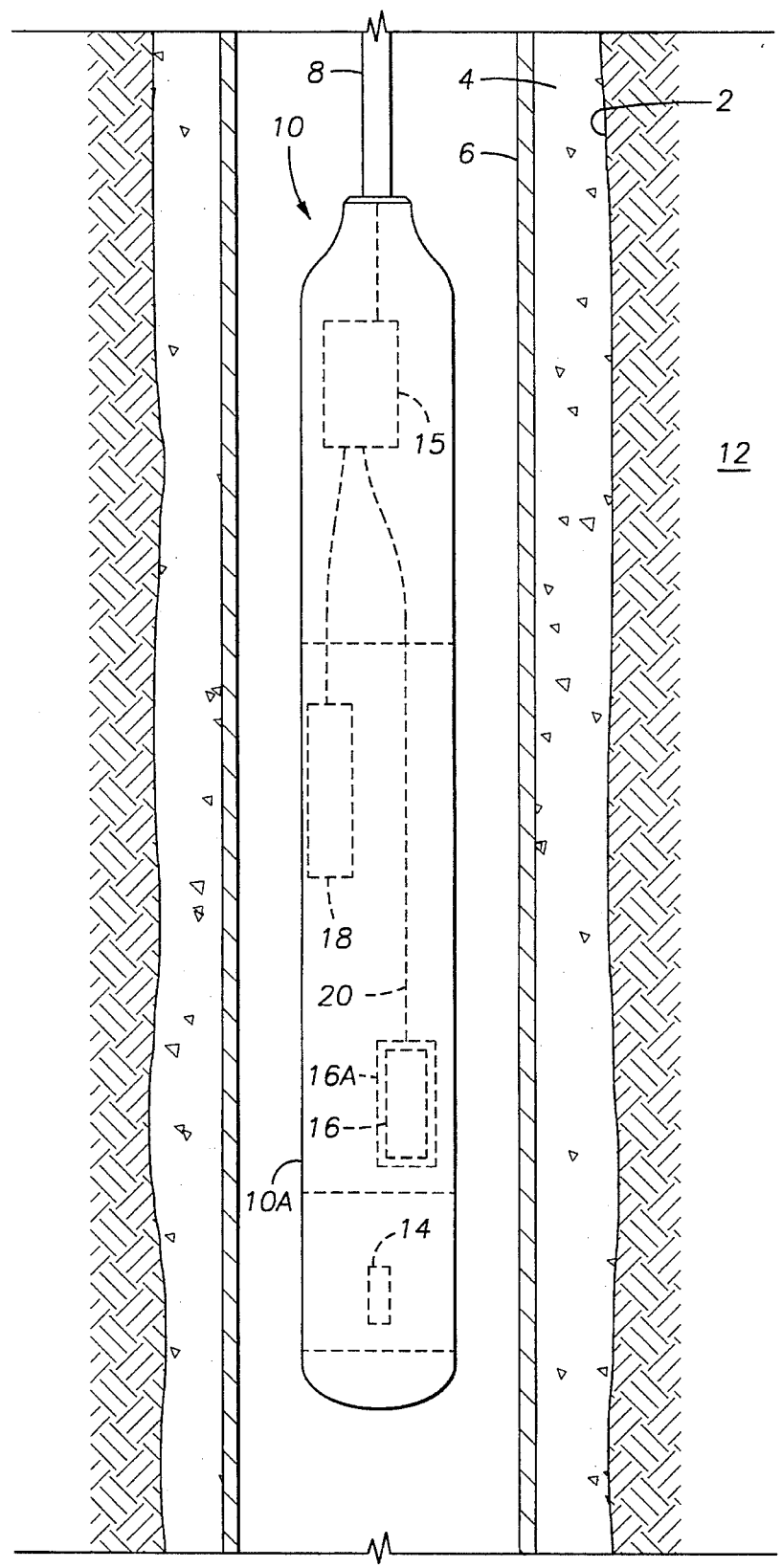
FIG. 1A shows the neutron tool of the present invention in more detail.

The operation of the neutron tool 10 according to the present invention can be better understood by referring to FIG. 1A. The tool 10 includes a housing 10A which is typically pressure sealed to exclude the fluids 13 in the wellbore 2 from the interior of the housing 10A. A source 14 of fast neutrons, which in the present embodiment can be a device having 4 curies of Americium-241 surrounded by beryllium. The source 14 can be cylindrical, having a length and a diameter of 1 inch. The source 14 is positioned generally at one end of the housing 10A and is substantially coaxial with the housing 10A. The housing 10A can be about $1^{11}/_{16}$ inch diameter, or similar external diameter, enabling the tool 10 to pass through an additional pipe string (not shown) which is typically coaxially inserted inside the casing 6 to a depth which is typically 100 to 200 feet above the perforations (shown as 11 in FIG. 1). It is contemplated that the source 14 can also be a controllable, accelerator-type neutron source of a design familiar to those skilled in the art and described for example in "PDK 100", Atlas Wireline Services, Houston, Tex., 1993.

The housing 10A is adapted to be urged into contact with the casing 6 in such a way so that the same side of the housing 10A is substantially always in contact with the casing 6. Several means for so urging the housing 10A into contact with the casing 6 are known in the art, and can include, for example, a bowspring (not shown) attached to the exterior of the housing 10A.

A first, also called near, detector 16 is positioned inside the housing 10A so that the end of the detector 16 closest to the source 14 is typically about 1 inch from the source 14. The first detector can be a Helium-3 proportional counter pressurized with helium-3 gas to 1.5 atmospheres (about 22 PSIA). The first detector 16 can be in the form of a cylinder having $\frac{3}{4}$ inch diameter and 1 inch length. The first detector 16 is positioned so that its axis is displaced $\frac{5}{16}$ inch from the axis of the source 14, the displacement being in the direction of the side of the housing 10A which faces away from the casing 6. The first detector 16 is wrapped in a neutron absorber, shown at 16A, such as cadmium metal foil having a thickness of 0.05 inch. All sides of the first detector 16 are so wrapped except for the end facing the source 14. The spacing of the first detector 16 relative to the source 14 and the housing 10A is chosen so that the first detector 16 is primarily responsive to the fluids filling the casing 6.

A second, or far, detector 18 is positioned axially spaced apart from the source 14 and the first detector 1.6. The second detector 18 can be a Helium-3 counter shaped in the form of a cylinder having 1 inch diameter and 6 inch length, the counter being pressurized with helium-3 gas to 10 atmospheres (about 150 PSIA). The end of the second detector 18 nearest the source 14 can be 14 inches from the source. The axis of the second detector 18 can be displaced from the axis of the source by $\frac{1}{4}$ inch. The axial displacement of the second detector 18 is in the direction of the side of the housing, 10A which is in contact with the casing 6. The spacing of the far detector 18 is chosen to be primarily responsive to the fluid content within the formation 12, which content is related to the porosity of the formation 12. The spacing of the far detector 18 is further chosen to be relatively insensitive to changes in the bulk density of the formation 12.

Substantially the entire enclosed volume inside the housing 10A between the near detector 16 and the far detector 18 is filled with a neutron moderating material, which can be composed of a plastic such as polypropylene. The plastic is shown in FIG. 1A as a moderator, shown generally at 20. The moderator 20 reduces the effects on the detectors 16, 18 of neutrons which may enter the housing 10A from a direction opposite to the side of the housing 10A on which the detector 16, 18 is positioned. The presence of the moderator 20 serves to direct the sensitivity of the near detector 16 to the wellbore 2, and to direct the sensitivity of the far detector 18 to the formation 14.

When neutrons are detected in either of the detectors 16, 18, an electrical pulse is transmitted to a telemetry transceiver 15 which communicates the numbers of detections corresponding to each of the detectors 16, 18 to the surface electronics 3.

2. Theory of Operation and Numerical Simulation Results

Monte Carlo numerical simulations were performed to determine the response of a tool built according to the specification recited herein.

Figure 2:
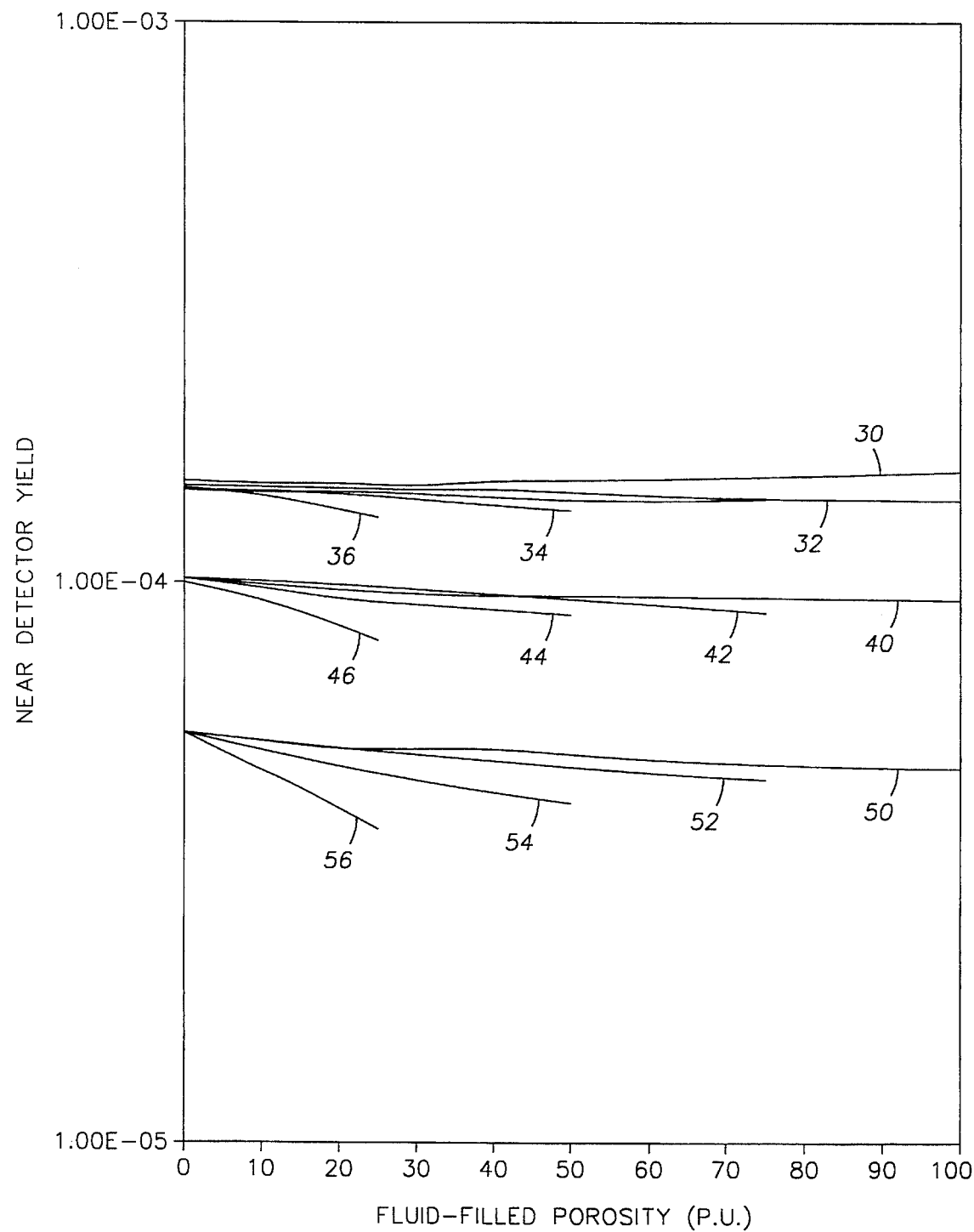
FIG. 2 shows a graph of the response of the near detector in the neutron tool.

Referring to FIG. 2, the response of the near detector (shown as 16 in FIG. 1A) will be explained. FIG. 2 is a graphic representation of detector count rate on the ordinate axis, and formation porosity on the coordinate axis. The response of the near detector 16 in an uncased, liquid-filled wellbore 2 and liquid-filled formation 12 porosity is shown at 30. Curves at 32, 34, and 36 show the near detector 16 response inside a 7-inch O. D. casing inside a liquid-filled wellbore 2 having a diameter of 8½ inches. The response curves 32, 34, 36 are representative of 25, 50 and 75 percent gas saturation in the formation 12 porosity, respectively. It can be observed that the response curves 32, 34, 36 exhibit almost no sensitivity to varying gas saturation in the formation 12.

The simulation was repeated for gas saturations in the wellbore 2 of 50 percent, as shown by the curves 40, 42, 44, and 46 for formation 12 gas saturations of 0, 25, 50 and 75 percent, respectively.

The simulation was again performed for a wellbore 2 being gas-filled, or having a gas saturation of 100 percent. Curves 50, 52, 54, 56 respectively show near detector 16 response in formations 12 having gas saturations of 0, 25, 50 and 75 percent. In each simulation, the near detector 16 is shown to exhibit the desired sensitivity to wellbore 2 gas saturation, and exhibits very little sensitivity to formation 12 gas saturation.

Figure 3:
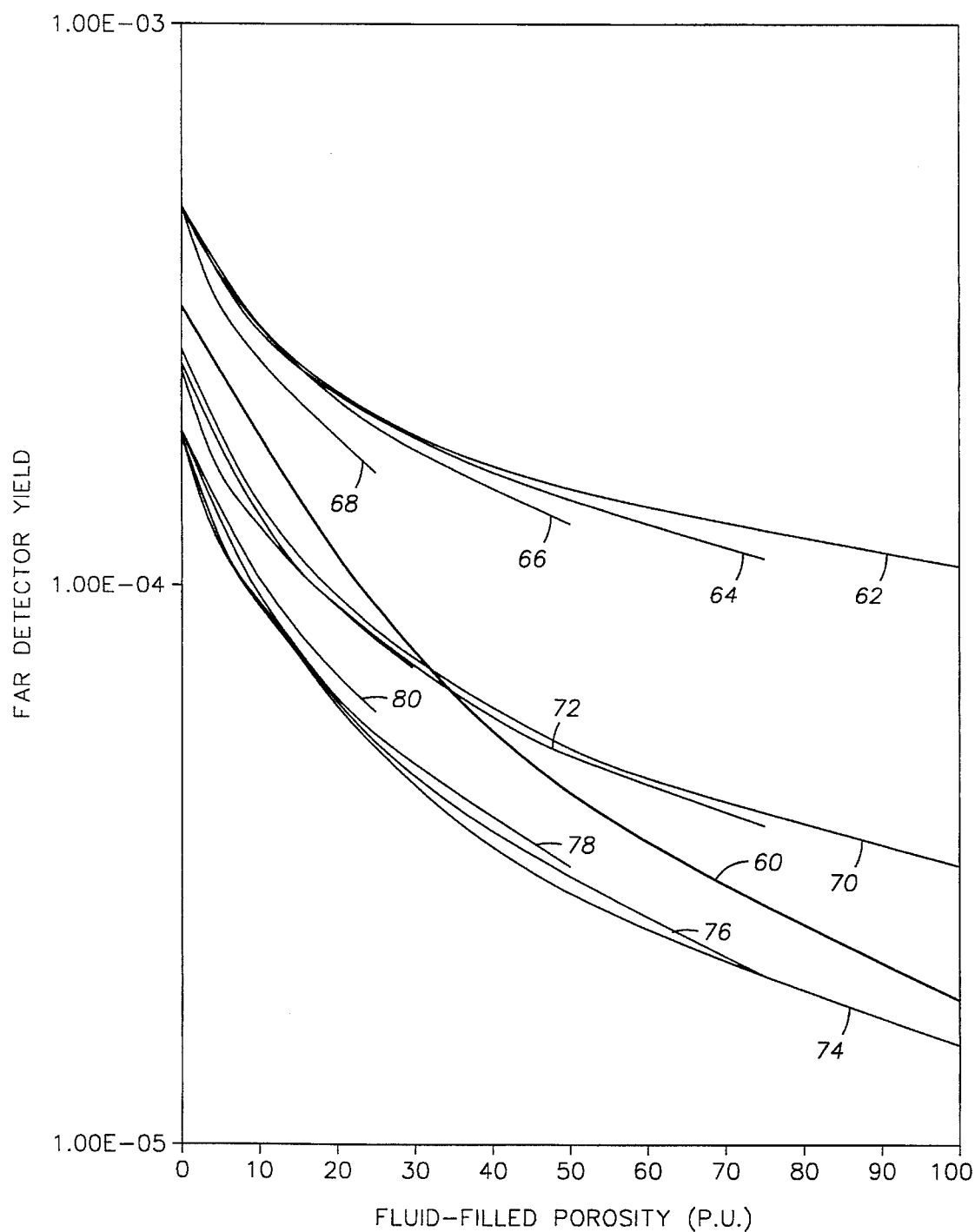
FIG. 3 shows a graph of the response of the far detector in the neutron tool.

As previously stated herein, the position of the far detector (shown as 18 in FIG. 1A) is chosen to enhance its response to changes in gas saturation of the formation (shown as 12 in FIG. 1A) while minimizing its sensitivity to changes in formation density. A better understanding of the response of the far detector 18 can be obtained by referring to FIG. 3. FIG. 3 is a graphic representation of numerically simulated far detector 18 count rate on the ordinate axis, and the formation 12 porosity on the coordinate axis. Curves 62, 64, 66, 68, respectively, show the response in a gas-filled wellbore 2 for formations 12 having gas saturations of 0, 25, 50 and 75 percent.

The response in a wellbore 2 having 50 percent gas saturation can be seen at curves 70 and 72. Responses for all four simulated formation 12 gas saturations (0, 25, 50, 75 percent) are shown, but the responses are so closely matched that only two curves 70, 72 can be seen separately.

Similar response curves for the four different formation 12 gas saturations when the wellbore 2 is liquid-filled can be observed at 74, 76, 78 and 80.

For comparison, a response in a simulated uncased, liquid-filled wellbore 2 with formation gas saturation equal to zero can be observed at 60.

The far detector 18 is shown to be generally responsive to the liquid-filled porosity of the formation 12, but is relatively insensitive to changes in formation gas saturation. The far detector 18 response is also partially sensitive to wellbore 2 gas saturation, as can be observed by the referring to FIG. 3, however, the wellbore 2 gas saturation can be determined by the response of the near detector 16. By determining the gas saturation in the wellbore 2 using the near detector 16, the response of the far detector 18 only to liquid-filled porosity in the formation 12 can be determined.

Figure 4:
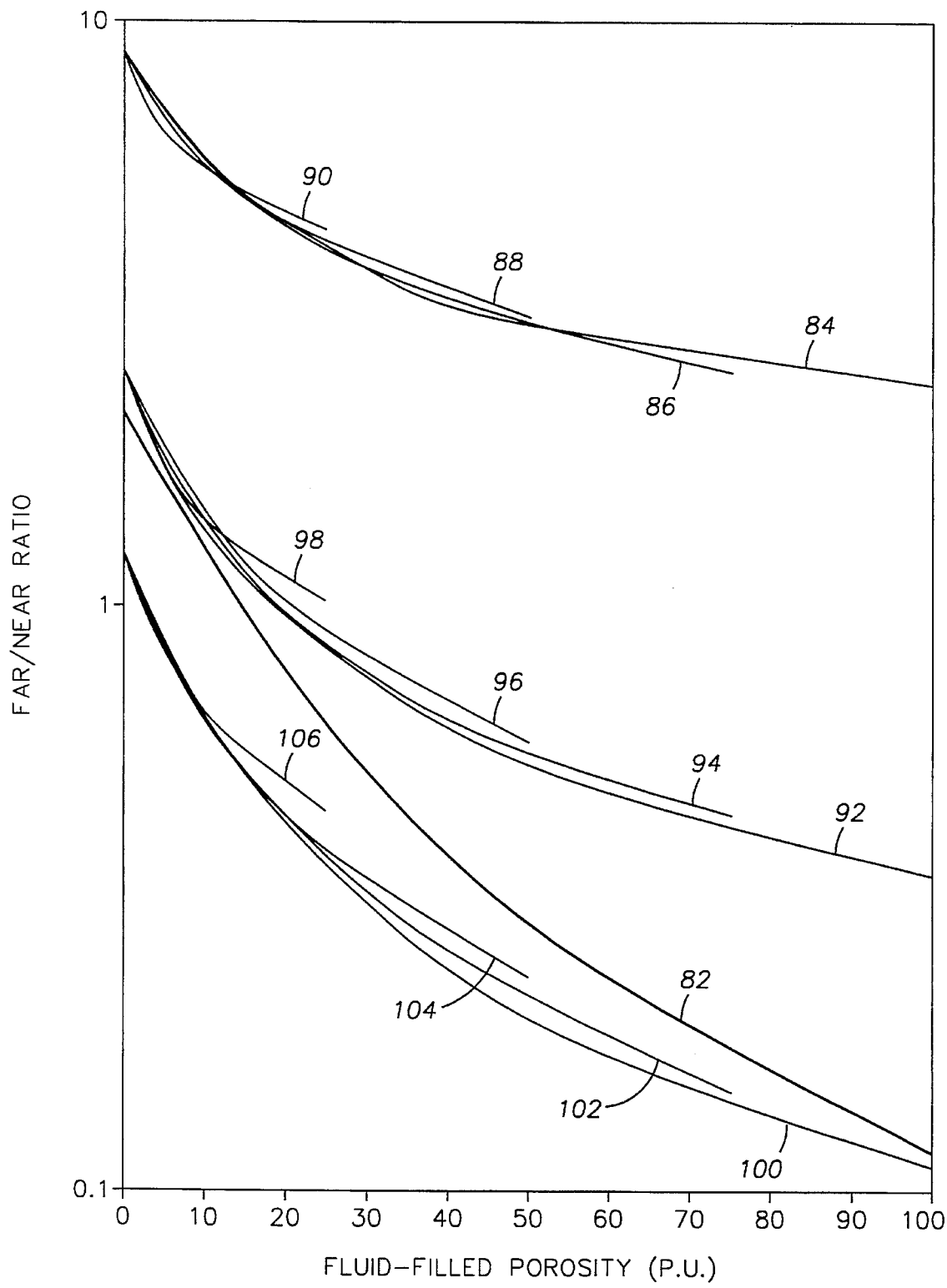
FIG. 4 shows a graph of the response of a far/near detector counting rate ratio.

An alternative method of using the far detector 18 to determine liquid-filled porosity in the formation 12 can be better understood by referring to FIG. 4. The graph in FIG. 4 represents the ratio of the counting rate of the far detector 18 to the counting rate of the near detector 16 on the ordinate axis, and liquid-filled porosity of the formation 12 on the coordinate axis. Response in a gas-filled wellbore 2 can be observed at 84, 86, 88 and 90 for formation gas saturations of 0, 25, 50 and 75 percent, respectively. Similar response curves are shown for a 50 percent gas-filled wellbore 2 at 92, 94, 96 and 98, and similarly for a liquid-filled wellbore 2 at 100, 102, 104 and 106, respectively. For comparison, the response in an uncased, liquid-filled wellbore 2 is shown at 82 for a formation having liquid-filled porosity. In the preferred embodiment, the counting rate ratio can be used for determining formation liquid-filled porosity instead of the far detector 18 count rate, because the ratio is relatively insensitive to changes in the output intensity of the source (shown as 14 in FIG. 1A), and in a gas-filled wellbore 2 is shown to be less sensitive to changes in density of the formation 12 as can be observed by the close correspondence of curves 84, 86, 88 and 90 in FIG. 4 compared to the curves using the far detector 18 count rate alone, shown at 62, 64, 66 and 68 in FIG. 3.

Figure 5:
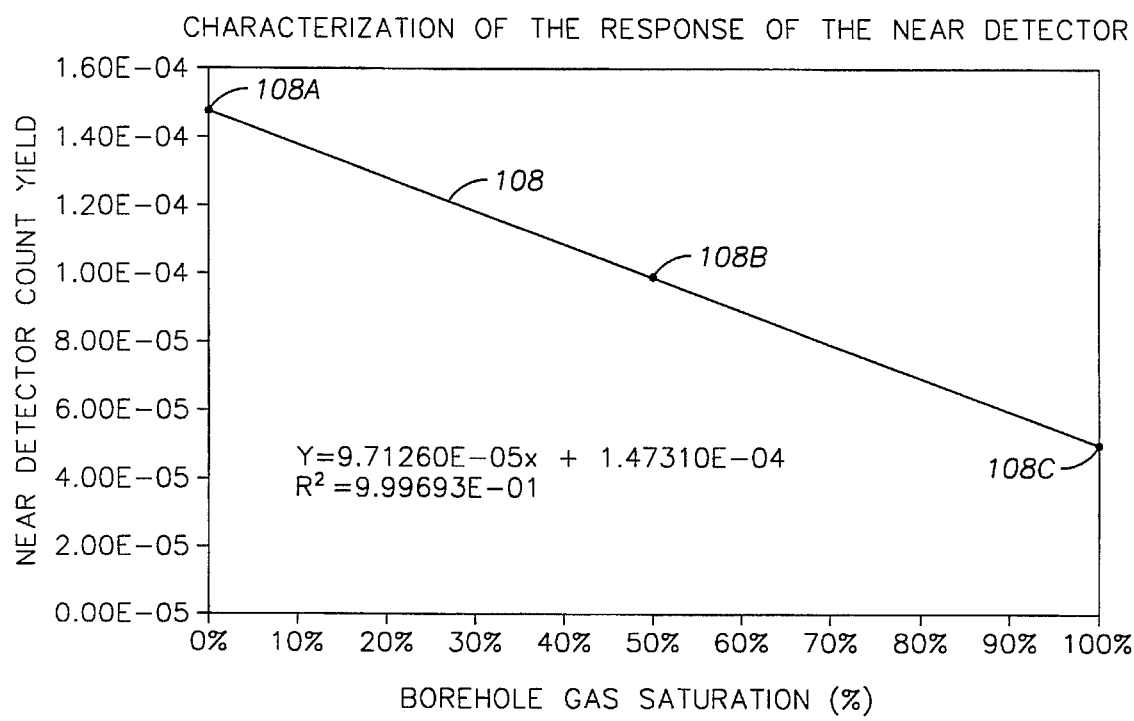
FIG. 5 shows a best-fit curve defining the response of the near detector to gas in the wellbore.

Characterization of the response of the near detector 16 to gas saturation in the wellbore 2 can be observed be referring to FIG. 5. Count rates were simulated for gas saturations of zero, 50 and 100 percent, as shown at 108A, 108B, and 108C, respectively. A log-linear best fit curve of the data is shown a curve at 108. The response defined by the curve 108 can be programmed into the surface electronics (shown as 3 in FIG. 1) to calculate values of wellbore gas saturation at a plurality of depths in the wellbore.

Figure 6:
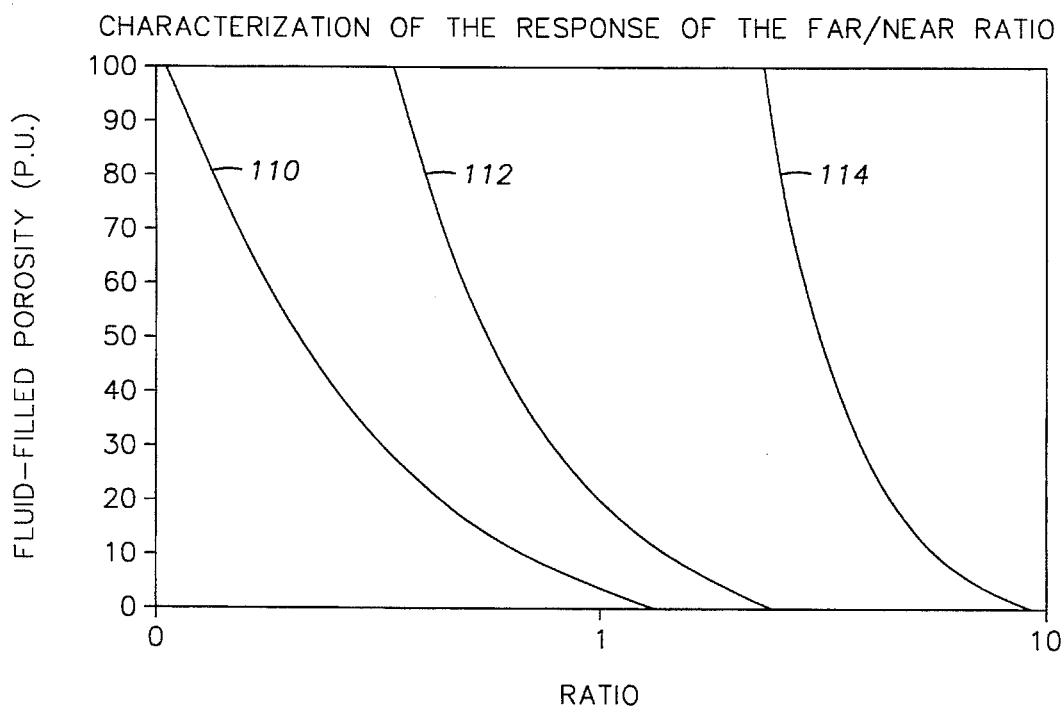
FIG. 6 shows response curves for the far/near counting rate ratio for various formation porosity values and different wellbore gas saturation values.

Characterization of the response of the previously described counting rate ratio can be observed by referring to FIG. 6. Response curves representing the counting rate ratio for various values of liquid-filled formation 12 porosity can be observed as curves 110, 112 and 114 representing the response at wellbore 2 gas saturation values of zero, 50 and 100 percent, respectively.

In the operation of the tool 10, the near detector 16 counting rate is used to calculate the wellbore 2 gas saturation, and then the counting rate ratio is used to determine the formation 12 liquid-filled porosity corresponding to the previously determined wellbore 2 gas saturation. In order to determine the fraction of the formation 12 porosity which is filled with gas, it is necessary to obtain data on the total porosity of the formation 12. As is known by those skilled in the art, the data on the total porosity of the formation 12 can be obtained by measurements taken from core samples of the formation 12, or can be derived from measurements made by the tool of the present invention or other logging tools which are run before the casing 6 is inserted into the wellbore.

TEST RESULTS

Monte Carlo simulated response of the tool 10 according to the present invention to various conditions of gas saturation in the wellbore 2 and various amounts of liquid-filled formation porosity can be observed by referring to FIGS. 7 through 11.

Figure 7:
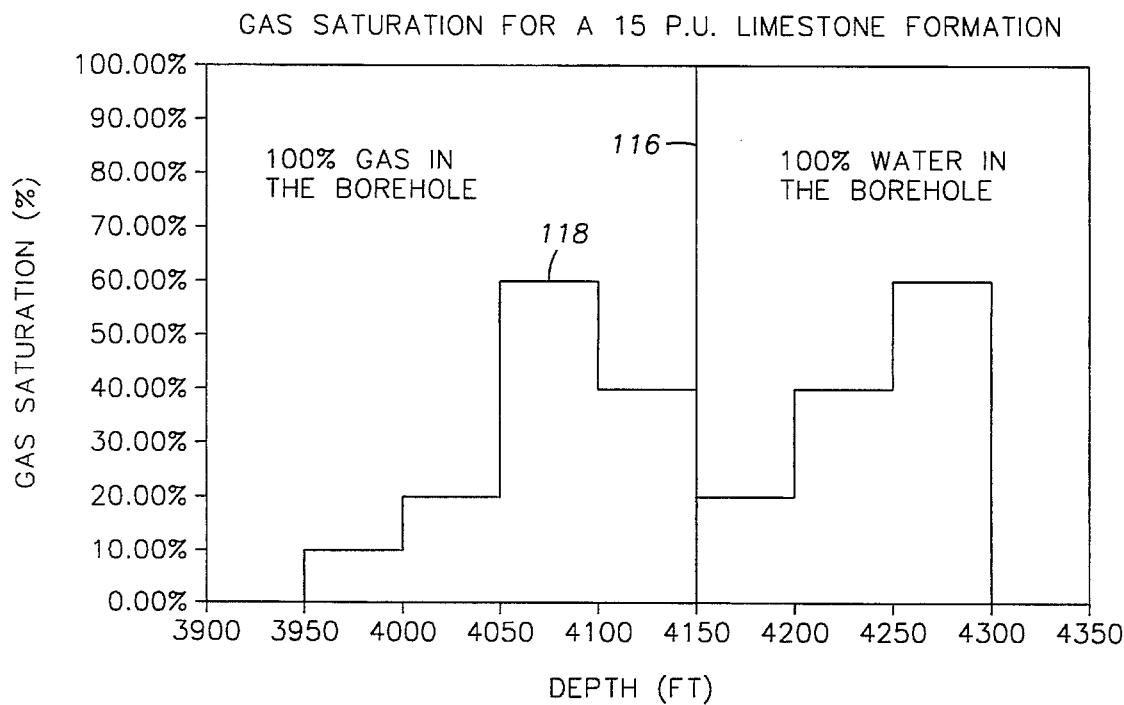
FIG. 7 shows simulated earth formation and wellbore conditions used to simulate actual response of the neutron tool of the present invention.

FIG. 7 shows a simulated "well log", which is a series of different, arbitrarily chosen values of gas saturation simulated to be present within a total porosity of 15 percent, in a simulated limestone formation. The gas saturation value is shown on the ordinate axis as a "blocked" curve 118, and the "depth" of the simulation is shown on the coordinate axis. A simulated gas/water contact in the "wellbore" is shown at 116 at an equivalent depth of 4150 feet. Above the contact 116, the simulated wellbore is 100 percent gas-filled, and below the contact 116, the wellbore is 100 percent water-filled.

Figure 8:
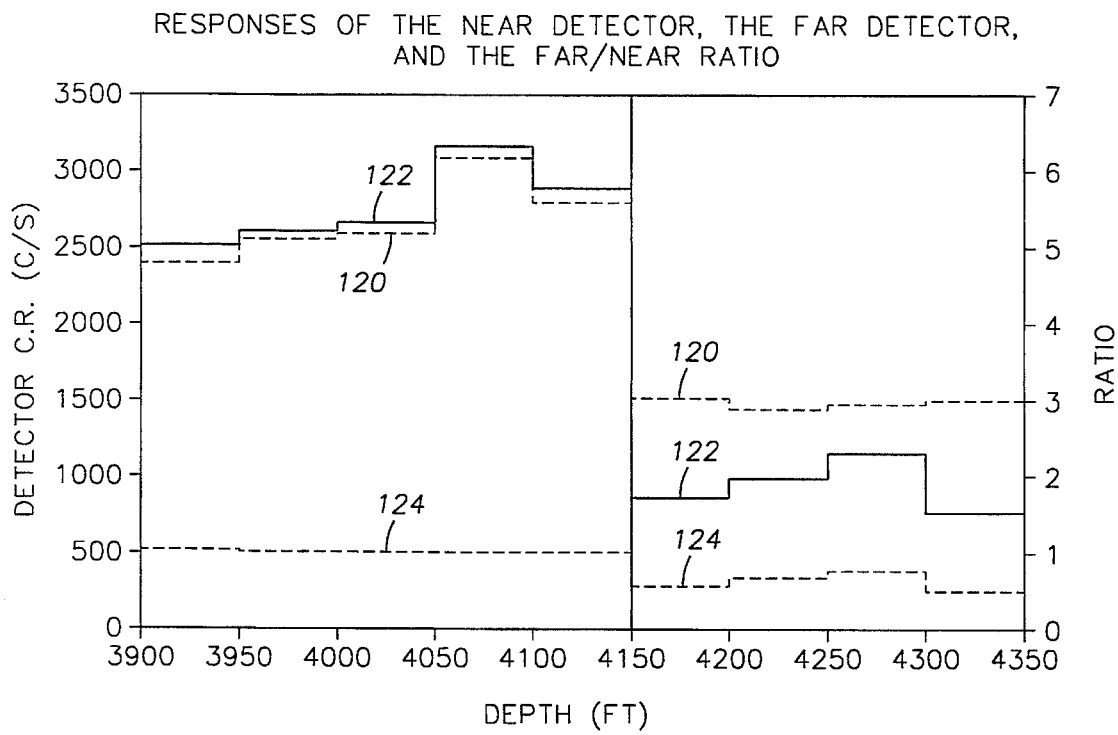
FIG. 8 shows the counting rates and the far/near ratio of the neutron tool within the simulated conditions of FIG. 7.

FIG. 8 shows the simulated responses, to the conditions shown in FIG. 7, of the near detector 16, shown at 120, the far detector 18, shown at 122, and the counting rate ratio, shown at 124. The near detector response 120 shows almost no sensitivity to formation porosity, while the far detector 122 and ratio 124 responses track the porosity values, as is to be expected for the intended sensitivities of the near 16 and the far 18 detectors.

Figure 9:
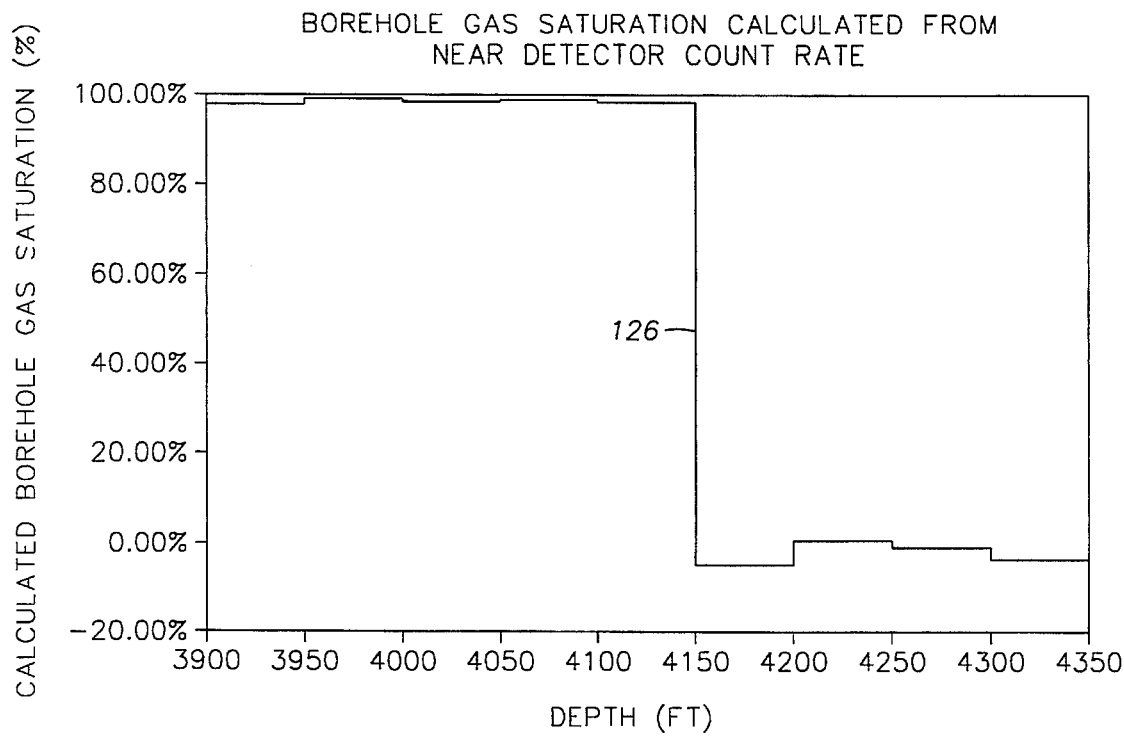
FIG. 9 shows gas saturation calculated from the near detector response in the experiment defined in FIG. 7.

FIG. 9 shows the wellbore gas saturation calculated from the near detector 16 response, generally at 126. The calculated response 126 substantially matches the conditions simulated.

Figure 10:
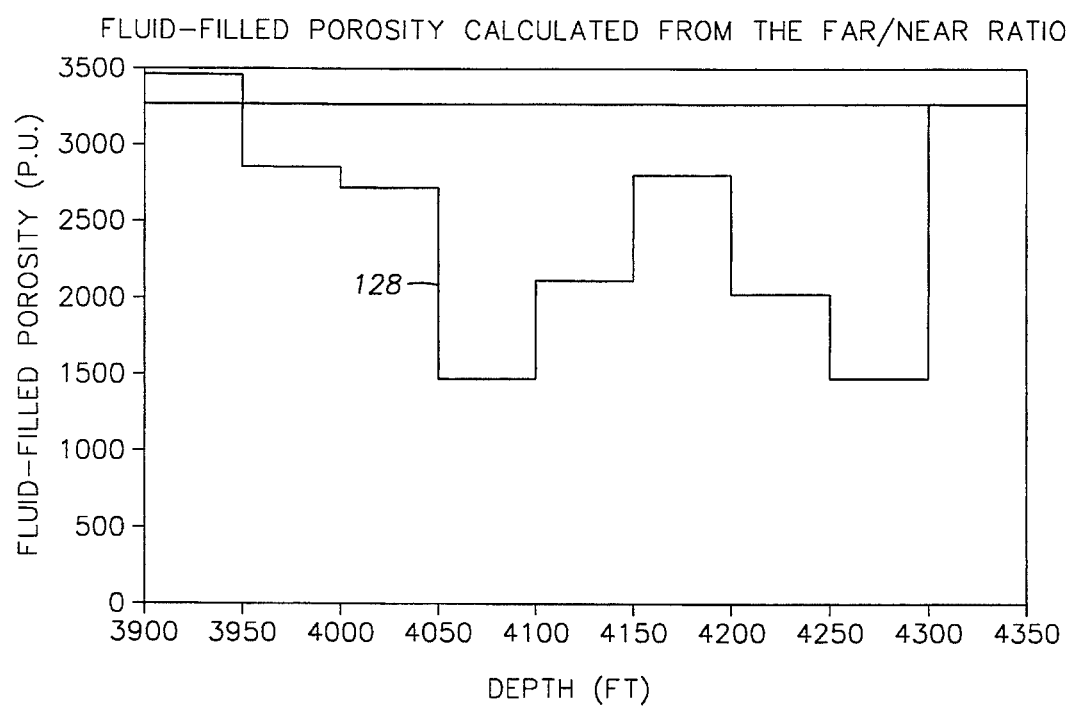
FIG. 10 shows fluid-filled porosity calculated from the far/near ratio of the neutron tool in the experiment defined in FIG. 7.

FIG. 10 shows the liquid-filled porosity calculated by the counting rate ratio, generally as a curve at 128.

Figure 11:
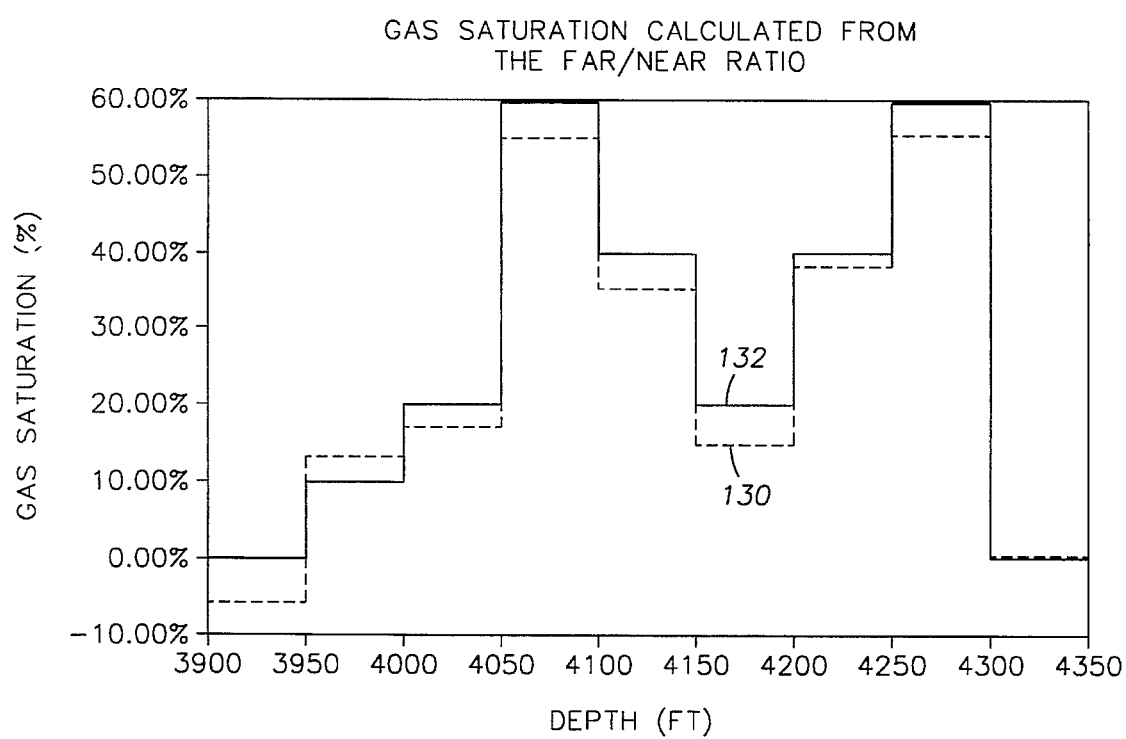
FIG. 11 compares the formation gas saturation determined by the neutron tool with the actual gas saturation of the experiment defined in FIG. 7.

FIG. 11 shows a comparison of a determination of the formation gas saturation as determined by the counting rate ratio, as shown at 130, compared with a calculated value of formation gas saturation, shown at 132, which is the fractional difference between the formation porosity, or 15 percent, and the gas filled porosity determined by the counting rate ratio, as shown in FIG. 10 as 128. Correspondence between the saturation determined by the system of the present invention and the calculated value is generally within 5 percent saturation, this correspondence representing an improvement over the prior art.

What is claimed is:

1. An apparatus for determining a gas saturation of an earth formation penetrated by a wellbore, said wellbore including a casing inserted therein, said apparatus comprising:

an elongated housing adapted to traverse said wellbore, said housing including a means for urging a side of said housing into contact with the interior of said casing;

a source of fast neutrons disposed within said housing;

a first neutron detector disposed within said housing, said first neutron detector radially displaced away from said side of said housing and towards said wellbore, said neutron detector axially spaced apart from said source at a distance enabling said first neutron detector to be responsive primarily to gas saturation in said wellbore;

a second neutron detector disposed within said housing and radially displaced towards said side of said housing, said second neutron detector axially spaced apart from said source at a distance enabling said second detector to be responsive primarily to a hydrogen nucleus concentration of said earth formation and to be substantially insensitive to changes in a bulk density of said earth formation; and a neutron moderator disposed within said housing so as to fill substantially the entire volume of said housing between said first and said second neutron detectors.

2. The apparatus as defined in claim 1 wherein said first neutron detector comprises a helium-3 counter.

3. The apparatus as defined in claim 2 wherein said helium-3 counter further includes a neutron shield comprising cadmium foil wrapping, said shield covering the exterior surface of said counter except an end directed towards said neutron source.

4. The apparatus as deformed in claim 1 wherein said second neutron detector comprises a helium-3 counter.

5. The apparatus as defined in claim 1 wherein said neutron moderator comprises a material having a high concentration of hydrogen nuclei.

6. The neutron moderator as defined in claim 5 wherein said material comprises polypropylene.

7. The apparatus as defined in claim 1 wherein said source of fast neutrons comprises americium-241 and beryllium.

8. The apparatus as defined in claim 1 further comprising a means for calculating a ratio of counting rates of said first and said second neutron detectors.

9. The apparatus as defined in claim 1 wherein said first neutron detector is axially spaced apart from said source at a distance of about one inch.

10. The apparatus as defined in claim 1 wherein said second neutron detector is axially spaced apart form said source at a distance of about fourteen inches.

11. A method of determining a gas saturation in an earth formation penetrated by a wellbore having a casing, said method comprising the steps of:

lowering a neutron logging tool into said wellbore, said tool having a housing including a means for urging a side of said housing into contact with said casing;

bombarding said earth formation with fast neutrons generated by a neutron source disposed within said housing;

detecting neutrons at a first neutron detector axially spaced apart from said source and radially displaced towards said wellbore so as to be primarily sensitive to a gas saturation in said wellbore;

detecting neutrons at a second neutron detector axially spaced apart from said source and radially displaced towards said side of said housing so as to be primarily sensitive to a hydrogen nucleus concentration in said earth formation and substantially insensitive to a bulk density of said earth formation;

calculating said gas saturation within said wellbore from a counting rate of said first detector;

calculating a liquid-filled porosity value of said earth formation from a ratio of counting rates of said first detector to said second detector; and calculating said gas saturation in said earth formation by combining said liquid-filled porosity value with a total porosity value of said earth formation.

12. The method as defined in claim 11 wherein said total porosity value is determined by well log measurements made before said casing is inserted into said wellbore.

13. The method as defined in claim 11 wherein said total porosity value is determined by measurements made on core samples of said earth formation.

* * * * *